INVENTORS.
NORMAN CHOATE STOREY.
PAUL RUDOLPH HASSON.

ATTORNEY

Feb. 18, 1936.  N. C. STOREY ET AL  2,031,188
ROTARY TILLING MACHINE
Filed Feb. 23, 1934  2 Sheets-Sheet 2
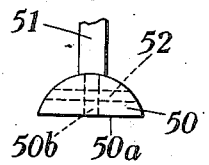
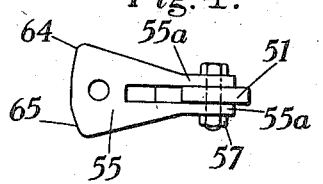
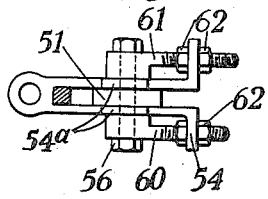
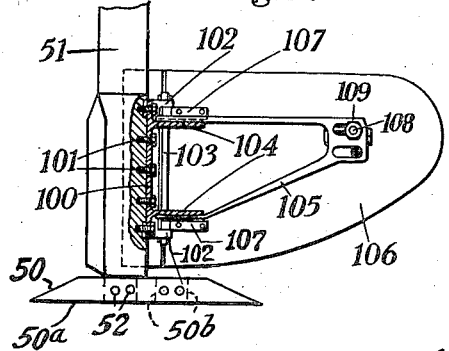
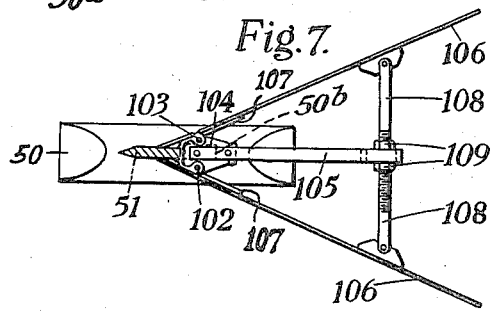
INVENTORS.
NORMAN CHOATE STOREY.
PAUL RUDOLPH HASSON.
BY
ATTORNEY.

Patented Feb. 18, 1936

2,031,188

UNITED STATES PATENT OFFICE 2,031,188

ROTARY TILLING MACHINE

Norman Choate Storey and Paul Rudolph Hasson, Hunslet, Leeds, England

Application February 28, 1934, Serial No. 713,364 In Great Britain March 30, 1933

13 Claims. (Cl. 97—43)

This invention relates to rotary tilling machines in which one or more rotary sets of tools are mounted on a frame hinged to the rear of the machine so as to engage the earth when the axis of revolution of the set of tools is inclined at a comparatively small angle to the vertical.

An object of the present invention is to provide an improved runner to hold the tilling tools at the desired depth below the surface of the ground.

A further object is to arrange and mount the runner so that it will ride beneath the surface of the soil in the wake of the tilling tools and will carry the load of said tools on the surface of the untilled sub-soil. By this arrangement of the runner, important advantages are obtained of a saving of power and a definite running depth.

Another object consists in mounting the runner on a tyne which latter can be utilized for attaching mouldboards, thus making the device a combined depth runner and a ridging implement.

Further objects of the invention consist in the provision of a hinged connection of the runner to the tiller frame to permit of lateral swing, means for limiting the lateral swing of the runner, means for vertically adjusting the height of the runner in relation to the working depth of the tilling tools, and means for adjusting the tilt of the runner in a fore and aft direction in the vertical plane.

Further objects will be apparent as the invention is described in greater detail in connection with the accompanying drawings, wherein:

Fig. 3 is an end view of the runner.

Fig. 4 is a plan view of the lower trailing hinge.

Fig. 5 is a plan view of the upper trailing hinge, showing the arrangement of the adjusting bolts.

Fig. 6 is a section on line 6—6 of Fig. 2 showing the mouldboards attached to the tyne for making the device a combined depth runner and ridging or ditching implement.

Fig. 7 is a plan view of Fig. 6.

Figure 1:
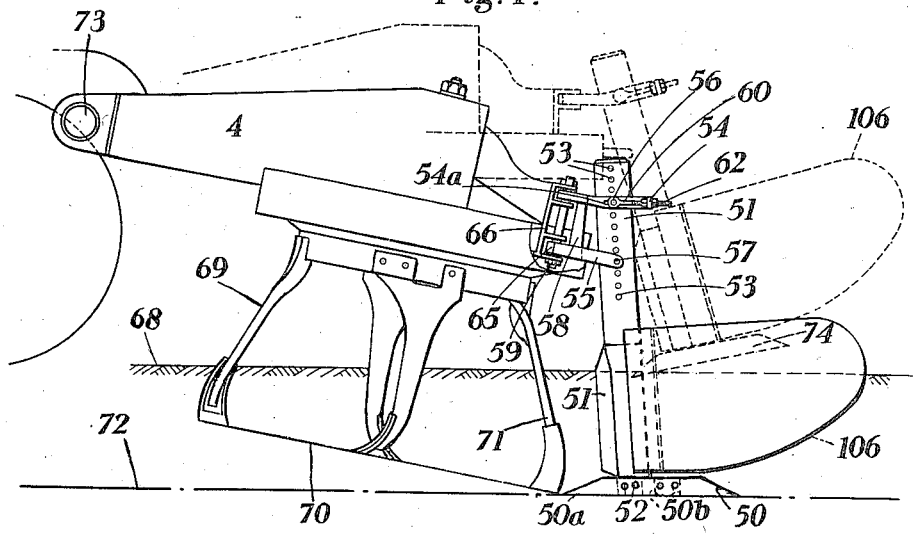
Fig. 1 is a side elevation showing the runner mounted on a vertical tyne at the rear of a rotary tilling machine.
Figure 2:
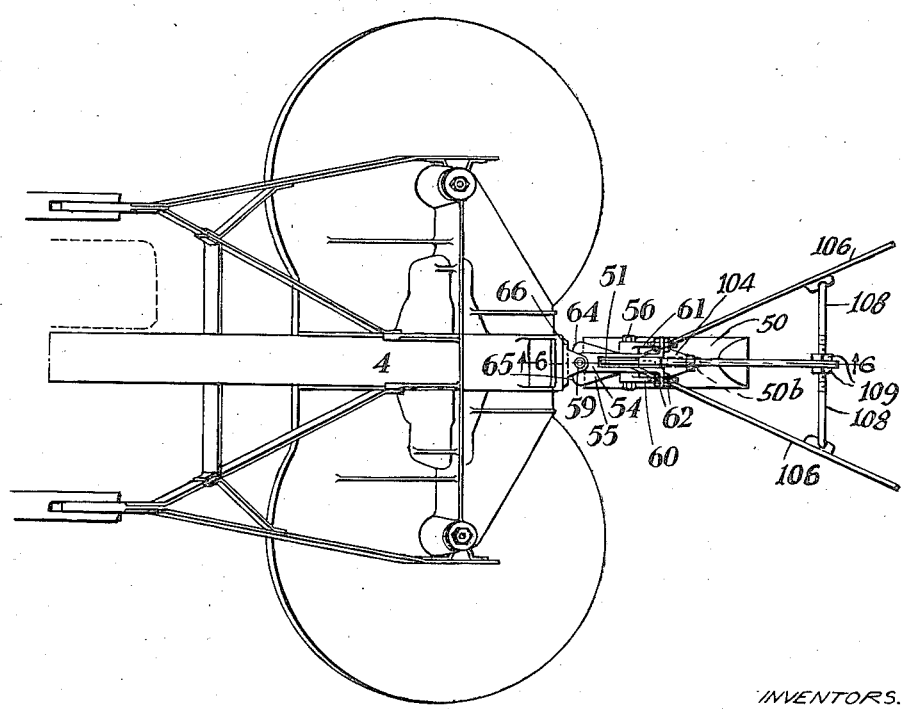
Fig. 2 is a plan view of Fig. 1.

50 is the runner, which may be half round in section (Fig. 3) having a flat lower surface 50a and is provided with a slotted hole 50b to receive and be carried on the bottom of a vertical tyne 51 and secured thereto by a pin or pins 52.

Two holes 50b are provided in the runner 50 and both ends are pointed so that the ends may be reversed in the case of wear.

The forward edge of tyne 51, is sharpened to make it cut its way easily through the ground, and above the ground and adjacent to the place where it is fastened to the machine 4 and on the flat side thereof, the tyne is provided with a series of holes 53 for securing the tyne to top and bottom trailing or lateral swing hinges 54 and 55 by means of bolts 56 and 57 set in suitably chosen holes 53 according to the depth at which the runner is intended to work.

The said upper and lower hinges 54 and 55 are joined and held rigid with respect to each other by an intermediate member 58, and the entire device is connected to the tilling machine 4 by means of a vertical or substantially vertical hinge pin 59.

The upper hinge 54 (Fig. 5) has its rear ends bent at right angles to receive eyebolts 60 and 61. These eyebolts are secured to the said hinge 54 by means of suitable lock nuts 62 and form a bearing for the bolt 56 which passes through slotted holes 54a in the hinge 54 and one of the fastening holes 53 in tyne 51.

The lower hinge 55 (Fig. 4) is provided with two cheeks 55a to receive the bolt 57 which passes through the tyne 51 permitting a hinging movement in the vertical plane.

The forward end of the hinge 55 is provided with extended points 64 and 65 which, when the device is swung on its trailing hinge pin 59, come in contact with the tiller frame at 66 thus acting as a stop and preventing the device from swinging too far to the right or left.

Mouldboards or ridgers such as 106 Figs. 1, 6 and 7 may be connected to the tyne 51 by means of a bracket 100 (Fig. 6) bolted to the rear of the tyne by screw bolts 101. The bracket 100 forms bearings 102 for hinge pins 103 which pass through hinge members 107 mounted on the mouldboards 106. The bracket 100 is also provided with rearwardly extending flanges 104 which form supports for a brace 105 to which the mouldboards are adjustably connected by rods 108 and nuts 109 so that said mouldboards may be adjustable to any desired angle. The tyne 51 may be provided with a series of holes for receiving the bolts 101 of the bracket 100 so that the mouldboards can be vertically adjustable according to the depth at which they are intended to work.

The operation of the device is as follows:—

Line 68, Fig. 1 represents the ground surface, lines 69, 70 and 71, represent the section through which the implements pass and the horizontal line 72 represents the depth tilled by the implements and the center point 73 is the axis about which the tiller frame 4 hinges when raised and lowered. In the position shown the runner 50 is in a horizontal position with respect to the ground level and is carrying the weight of the tiller frame 4 on its lower flat surface 50a on the surface of the untilled sub-soil and if dragged forward in the same horizontal plane it will not go deeper because to go deeper it must swing about the center point 73 which would change the angle of the bottom face of the runner from a horizontal to an inclined plane and thus cut its way up to a horizontal plane again, or should the runner be lifted by swinging about said center point 73, then the lower face of the runner would assume a downwardly inclined plane and cut its way down to a horizontal line again. When the runner is swung about center 73 to the ground's surface as shown by dotted lines 74, its digging position is clearly shown.

If it is desired to till to a deeper or shallower level, then the bottom plane of the runner 50 is changed to either dig up or down to a different level by changing the vertical axis of the tyne with respect to the tilling frame by means of the lock nuts 62 on the upper hinge 54 and thus the runner 50 will assume a new horizontal plane on a higher or lower level.

As with most tilling machines it is necessary to pull various types of implements behind the tillers to further the preparation of the seed bed, and as some of these implements are constructed with a center standard, the tyne 51 may be utilized for such a purpose as for example the attaching of the mouldboards 106 to the tyne thus making the device a combined depth runner and a ridging or ditching implement.

In tilling with this type of machine it is often necessary to till on a curve, therefore, the vertical hinging feature is provided to make the device track, because without being able to swing, the flat surface of the tyne would act as the land side of a plough and prevent the rear end of the tiller from swinging. To prevent the runner from swinging into the tilling tools when the tillers are lifted out of the ground, the lower hinge 55 has been provided with the stop lugs 64 and 65 as already mentioned.

As it is desirous to work the runner at the bottom of the tilled soil, the series of holes 53 in the tyne are provided to raise or lower the runner to suit the length of implements installed on the tiller.

What we claim as our invention and desire to secure by Letters Patent of the United States is:—

1. In a tilling machine comprising a frame carrying rotatory tilling tools and hinged to the rear of the machine to swing in a vertical plane, the combination with said frame of a tyne hingedly connected to said frame to swing in a substantially horizontal plane, means for limiting the hinging movement of said tyne and a runner mounted on said tyne and adapted, when said frame is lowered, to ride beneath the surface of the disturbed soil in the wake of said tilling tools and to carry the load of said frame on the surface of the untilled sub-soil.

2. In a tilling machine comprising a frame carrying rotatory tilling tools and hinged to the rear of the machine to swing in a vertical plane, the combination with said frame of a tyne hingedly connected to said frame to swing in a substantially horizontal plane, a runner mounted on said tyne and adapted, when said frame is lowered, to ride beneath the surface of the disturbed soil in the wake of said tilling tools and to carry the load of said frame on the surface of the untilled sub-soil, ridging implements and means for detachably connecting said ridging implements to said tyne.

3. In a tilling machine comprising a frame carrying rotatory tilling tools and hinged to the rear of the machine to swing in a vertical plane, the combination with said frame of a tyne hingedly connected to said frame to swing in a substantially horizontal plane, a runner mounted on said tyne and adapted, when the frame is lowered, to ride beneath the surface of the disturbed soil in the wake of said tilling tools and to carry the load of said frame on the surface of the untilled sub-soil, ridging implements, means for detachably connecting said ridging implements to said tyne and means for vertically adjusting said ridging implements on said tyne.

4. In a tilling machine comprising a frame carrying rotatory tilling tools and hinged to the rear of the machine to swing in a vertical plane, the combination with said frame of a tyne hingedly connected to said frame for pivotal movement about a substantially vertical axis, a runner mounted on said tyne and adapted, when the frame is lowered, to ride beneath the surface of the disturbed soil in the wake of said tilling tools and to carry the load of said frame on the surface of the untilled sub-soil, ridging implements, means for detachably connecting said ridging implements to said tyne and means for angularly adjusting said ridging implements on said tyne.

5. In a tilling machine comprising a frame carrying rotatory tilling tools and hinged to the rear of the machine to swing in a vertical plane, the combination with said frame of a tyne hingedly connected to said frame for pivotal movement about a substantially vertical axis, means for limiting the hinging movement of said tyne, a runner mounted on said tyne and adapted, when the frame is lowered, to ride beneath the surface of the disturbed soil in the wake of said tilling tools and to carry the load of said frame on the surface of the untilled sub-soil, means for vertically adjusting the height of said runner in relation to the working depth of the tilling tools, means for adjusting the tilt of the runner in a fore and aft direction in the vertical plane, ridging implements, means for detachably connecting said ridging implements to said tyne and means for vertically and angularly adjusting said ridging implements on said tyne.

6. In a tilling machine, a frame carrying tilling tools, means for attaching the forward end of said frame to said tilling machine for movement about a horizontal axis, a tyne, means for connecting said tyne to the rear of said frame for pivotal movement about a substantially vertical axis, and a runner carried by the lower end of said tyne adapted when the frame is lowered to ride beneath the surface of the soil tilled by said tilling tools and to carry the rear end of said frame on the surface of the untilled sub-soil.

7. In a tilling machine, a frame carrying tilling tools, means for attaching the forward end of said frame to said tilling machine for movement about a horizontal axis, a tyne, means for connecting said tyne to the rear of said frame for pivotal movement about a substantially vertical axis, a runner carried by the lower end of said tyne adapted when the frame is lowered to ride beneath the surface of the soil tilled by said tilling tools and to carry the rear end of said frame on the surface of the untilled sub-soil, and ridging implements attached to the rear of said tyne.

8. In a tilling machine, a frame carrying tilling tools, means for attaching the forward end of said frame to said tilling machine for movement about a horizontal axis, a substantially vertically positioned pintle pin mounted on the rear of said frame, a substantially vertically positioned tyne at the rear of said frame, means for attaching said tyne to said pintle pin to provide for swinging of said tyne about the axis of said pintle pin, and a runner carried by the lower end of said tyne adapted when the frame is lowered to ride beneath the surface of the soil tilled by said tilling tools and to carry the rear end of said frame on the surface of the untilled sub-soil.

9. In a tilling machine, a frame carrying tilling tools, means for attaching the forward end of said frame to said tilling machine for movement about a horizontal axis, a substantially vertically positioned pintle pin mounted on the rear of said frame, a substantially vertically positioned tyne at the rear of said frame, means for attaching said tyne to said pintle pin to provide for swinging of said tyne about the axis of said pintle pin, a runner carried by the lower end of said tyne adapted when the frame is lowered to ride beneath the surface of the soil tilled by said tilling tools and to carry the rear end of said frame on the surface of the untilled sub-soil, and ridging implements attached to the rear of said tyne.

10. In a tilling machine, a frame carrying tilling tools, means for attaching the forward end of said frame to said tilling machine for movement about a horizontal axis, a substantially vertically positioned pintle pin mounted on the rear of said frame, a substantially vertically positioned tyne at the rear of said frame, upper and lower horizontal arms pivotally carried by said pintle pin, means for adjustably connecting the free ends of said arms to said tyne, and a runner carried by the lower end of said tyne adapted when the frame is lowered to ride beneath the surface of the soil tilled by said tilling tools and to carry the rear end of said frame on the surface of the untilled sub-soil.

11. In a tilling machine, a frame carrying tilling tools, means for attaching the forward end of said frame to said tilling machine for movement about a horizontal axis, a substantially vertically positioned pintle pin mounted on the rear of said frame, a substantially vertically positioned tyne at the rear of said frame, upper and lower horizontal arms pivotally carried by said pintle pin, means for adjustably connecting the free ends of said arms to said tyne, a runner carried by the lower end of said tyne adapted when the frame is lowered to ride beneath the surface of the soil tilled by said tilling tools and to carry the rear end of said frame on the surface of the untilled sub-soil, and ridging implements attached to the rear of said tyne.

12. In a tilling machine, a frame carrying tilling tools, means for attaching the forward end of said frame to said tilling machine for movement about a horizontal axis, a substantially vertically positioned pintle pin mounted on the rear of said frame, a substantially vertically positioned tyne at the rear of said frame, upper and lower horizontal arms pivotally carried by said pintle pin, means for pivotally connecting the free end of the lower arm to said tyne, tyne attachment means carried by the free end of said upper arm, means for varying the distance between said pin and attachment means, and a runner carried by the lower end of said tyne adapted when the frame is lowered to ride beneath the surface of the soil tilled by said tilling tools and to carry the rear end of said frame on the surface of the untilled sub-soil.

13. In a tilling machine, a frame carrying tilling tools, means for attaching the forward end of said frame to said tilling machine for movement about a horizontal axis, a substantially vertically positioned pintle pin mounted on the rear of said frame, a substantially vertically positioned tyne at the rear of said frame, upper and lower horizontal arms pivotally carried by said pintle pin, means for pivotally connecting the free end of the lower arm to said tyne, tyne attachment means carried by the free end of said upper arm, means for varying the distance between said pin and attachment means, a runner carried by the lower end of said tyne adapted when the frame is lowered to ride beneath the surface of the soil tilled by said tilling tools and to carry the rear end of said frame on the surface of the untilled sub-soil, and ridging implements attached to the rear of said tyne.

NORMAN CHOATE STOREY.
PAUL RUDOLPH HASSON.